(12) United States Patent
Liu

(10) Patent No.: US 8,531,123 B2
(45) Date of Patent: Sep. 10, 2013

(54) DC/DC CONVERTER WITH MULTIPLE OUTPUTS

(75) Inventor: Da Liu, Milpitas, CA (US)

(73) Assignee: O2Micro, Inc., Santa Clara, CA (US)

( * ) Notice: Subject to any disclaimer, the term of this patent is extended or adjusted under 35 U.S.C. 154(b) by 375 days.

(21) Appl. No.: 12/973,460

(22) Filed: Dec. 20, 2010

(65) Prior Publication Data

US 2011/0109248 A1  May 12, 2011

(51) Int. Cl.
   *H05B 41/16* (2006.01)
(52) U.S. Cl.
   USPC ........ 315/247; 315/185 S; 315/291; 315/307; 315/312
(58) Field of Classification Search
   USPC .................. 315/274–289, 247, 291, 307–326
   See application file for complete search history.

(56) References Cited

U.S. PATENT DOCUMENTS

| 7,221,111 | B2 * | 5/2007 | Hirosawa | 315/360 |
| 2012/0068982 | A1 * | 3/2012 | Lee et al. | 345/208 |

* cited by examiner

Primary Examiner — Tuyet Thi Vo

(57) ABSTRACT

Embodiments of the invention provided a DC/DC converter. The DC/DC converter includes a transformer, a first controller and a first switch. The transformer has a primary winding coupled to a power source, a first secondary winding for providing a first output voltage and a second secondary winding for providing a second output voltage. The first controller is coupled to the primary winding for controlling input power to the primary winding to regulate the first output voltage. The switch is coupled to the second secondary winding and for regulating the second output voltage. The first switch is controlled by a pulse modulation signal. A current flows through the second secondary winding if the pulse modulation signal is in the first state, and the current flowing through the second secondary winding remains cut-off if the pulse modulation signal is in the second state.

16 Claims, 8 Drawing Sheets

DC/DC CONVERTER WITH MULTIPLE OUTPUTS

BACKGROUND

A display system usually includes an illuminating module and a control module. The illuminating module includes one or more light sources, e.g., multiple light-emitting diode (LED) strings. The control module which may include a micro-controller, a video processor and an audio processor controls the on/off and dimming of the illuminating module and processes the video and audio signals. The power requirement of the illuminating module and the power requirement of the control module may be different. Thus, an input AC voltage is converted to a first DC voltage to power the illuminating module and a second DC voltage different from the first DC voltage to power the control module.

FIG. 1 illustrates an example of a conventional display system 100. An AC/DC converter 104 receives an AC voltage from an AC power source 102 and outputs a DC voltage VIN. A transformer 130 receives the DC voltage VIN at a primary winding 106, generates an output voltage VOUT1 at a first secondary winding 110, and generates an output voltage VOUT2 at a second secondary winding 108. The output voltage VOUT1 is used to power a control module 128 which includes a micro controller, a video processor and an audio processor. The output voltage VOUT2 is used to power an illuminating module 126 which includes multiple LED strings. The control module 128 generates an ON/OFF signal to turn on or turn off the illuminating module 126, and generates a DIM signal to adjust brightness of the illuminating module 126. An error amplifier 118 senses VOUT1 through a voltage divider 120 and controls an optocoupler 116 to generate a feedback signal FB indicative of VOUT1. A DC/DC controller 114 receives the feedback signal FB and generates a pulse signal to control a switch 112 which is coupled in series with the primary winding 106. By controlling the switch 112, the power delivered from the primary winding 106 to the secondary winding 110 is adjusted such that VOUT1 is regulated to a first level to satisfy a power requirement of the control module 128. By controlling the switch 112, VOUT2 also varies. A power converter, e.g., a boost converter 122, is coupled between the secondary winding 108 and the illuminating module 126. The boost converter 122 regulates VOUT2 to a second level to satisfy a power requirement of the illuminating module 126. Thus, in order to generate the output voltage VOUT2 which has a different voltage level from the output voltage VOUT1, an extra power converter (e.g., the boost converter 122) is used, which increases the cost of the system.

FIG. 2 illustrates another example of a conventional display system 200. Elements labeled the same as in FIG. 1 have similar functions. The conventional display system 200 includes a first transformer 230 and a second transformer 232. The first transformer 230 generates a first output voltage VOUT1 to power a control module 128. The second transformer 232 generates a second output voltage VOUT2 to power an illuminating module 126. A first DC/DC controller 214 controls a first switch 204 in series with a primary winding of the first transformer 230 to adjust the output voltage VOUT1 based on a feedback signal FB1 from a first optocoupler 236. A second DC/DC controller 216 controls a second switch 202 in series with a primary winding of the second transformer 232 to adjust the output voltage VOUT2 based on a feedback signal FB2 from a second optocoupler 234. Therefore, an extra DC/DC controller 216, an extra transformer 232 and an extra optocoupler 234 are used, which also increase the cost of the system.

SUMMARY

Embodiments of the invention provided a DC/DC converter. The DC/DC converter includes a transformer, a first controller and a first switch. The transformer has a primary winding coupled to a power source, a first secondary winding for providing a first output voltage and a second secondary winding for providing a second output voltage. The first controller is coupled to the primary winding for controlling input power to the primary winding to regulate the first output voltage. The switch is coupled to the second secondary winding and for regulating the second output voltage. The first switch is controlled by a pulse modulation signal. A current flows through the second secondary winding if the pulse modulation signal is in the first state, and the current flowing through the second secondary winding remains cut-off if the pulse modulation signal is in the second state.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
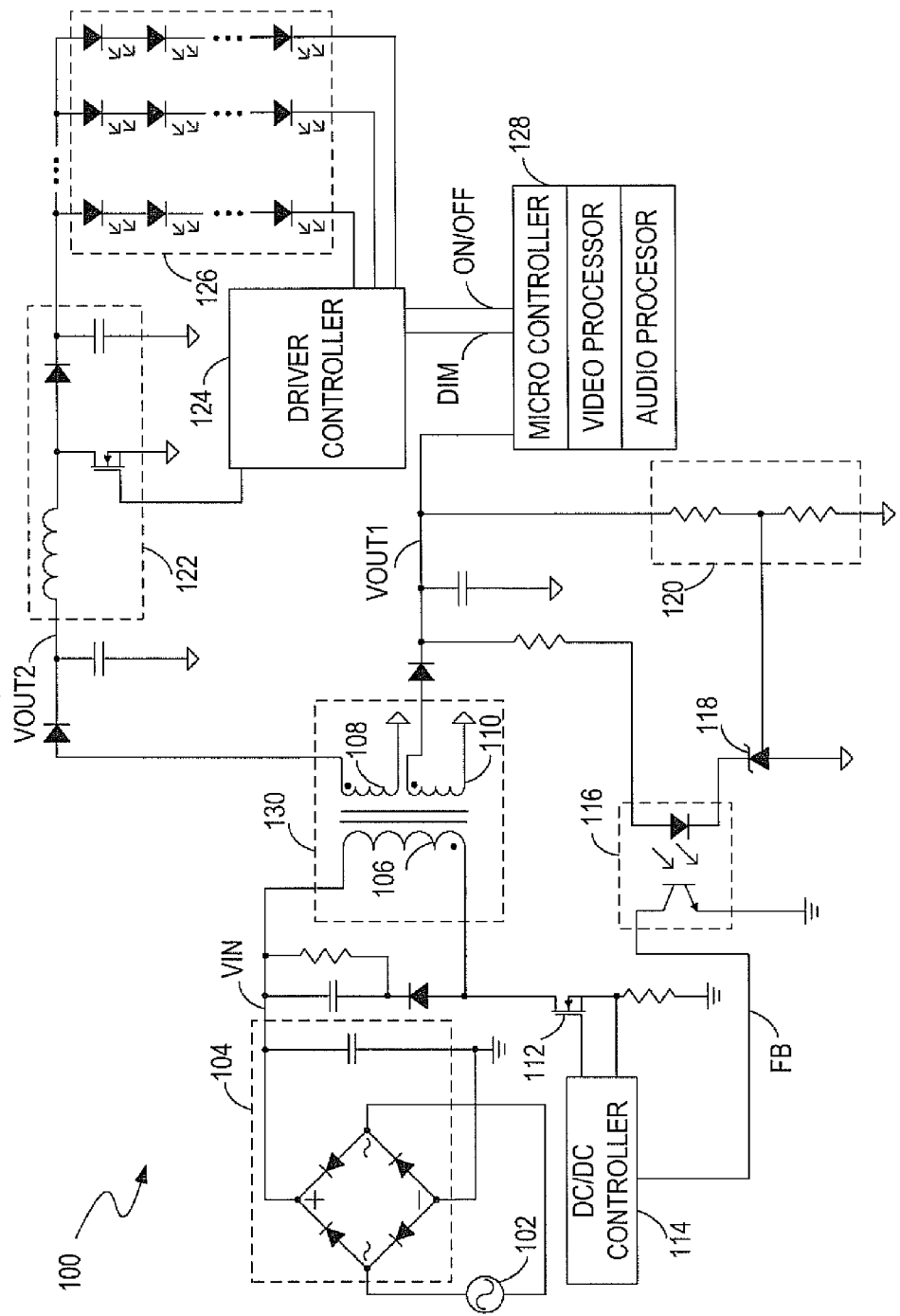
FIG. 1 illustrates an example of a conventional display system.
Figure 2:
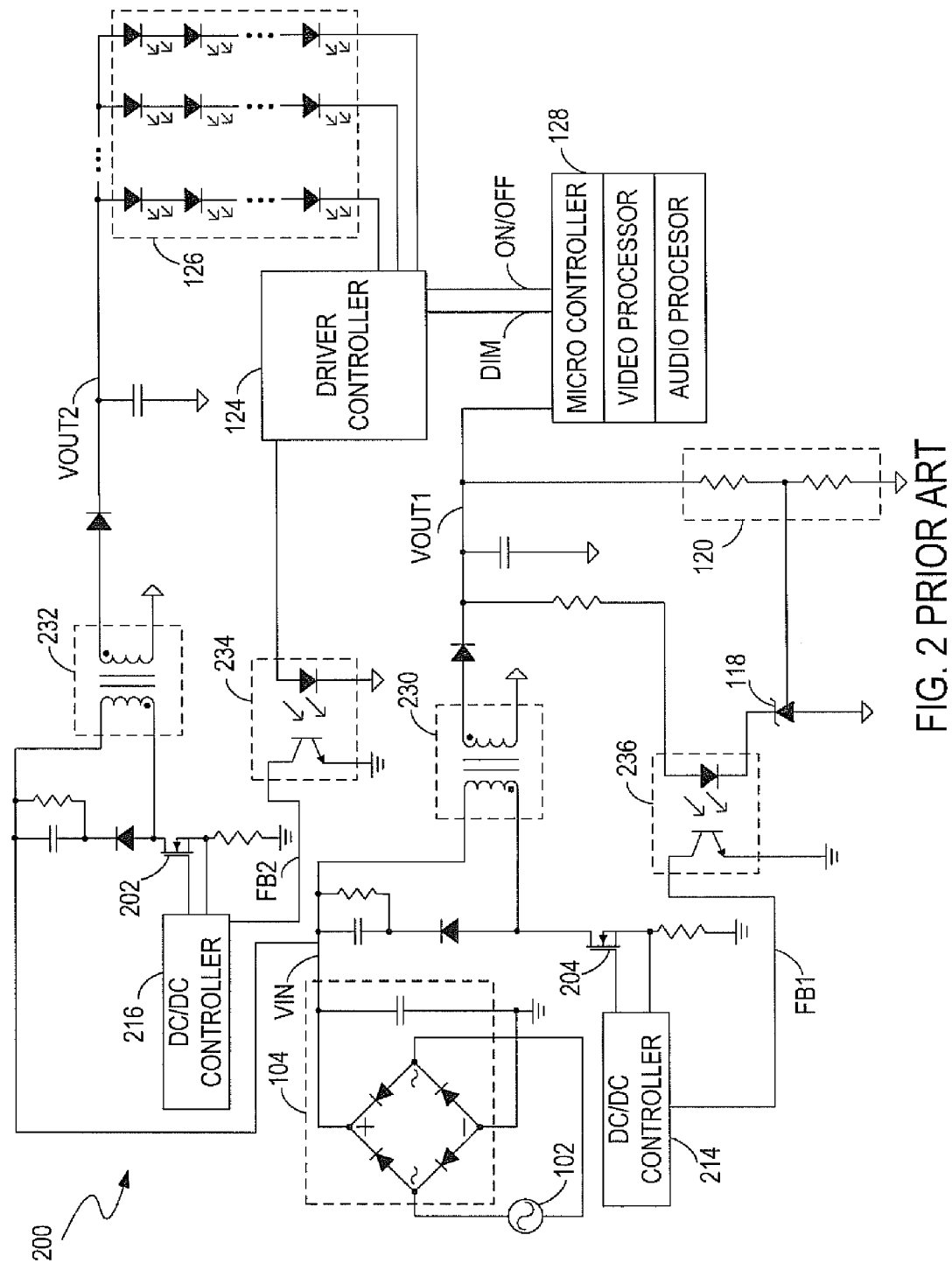
FIG. 2 illustrates another example of a conventional display system.
Figure 3:
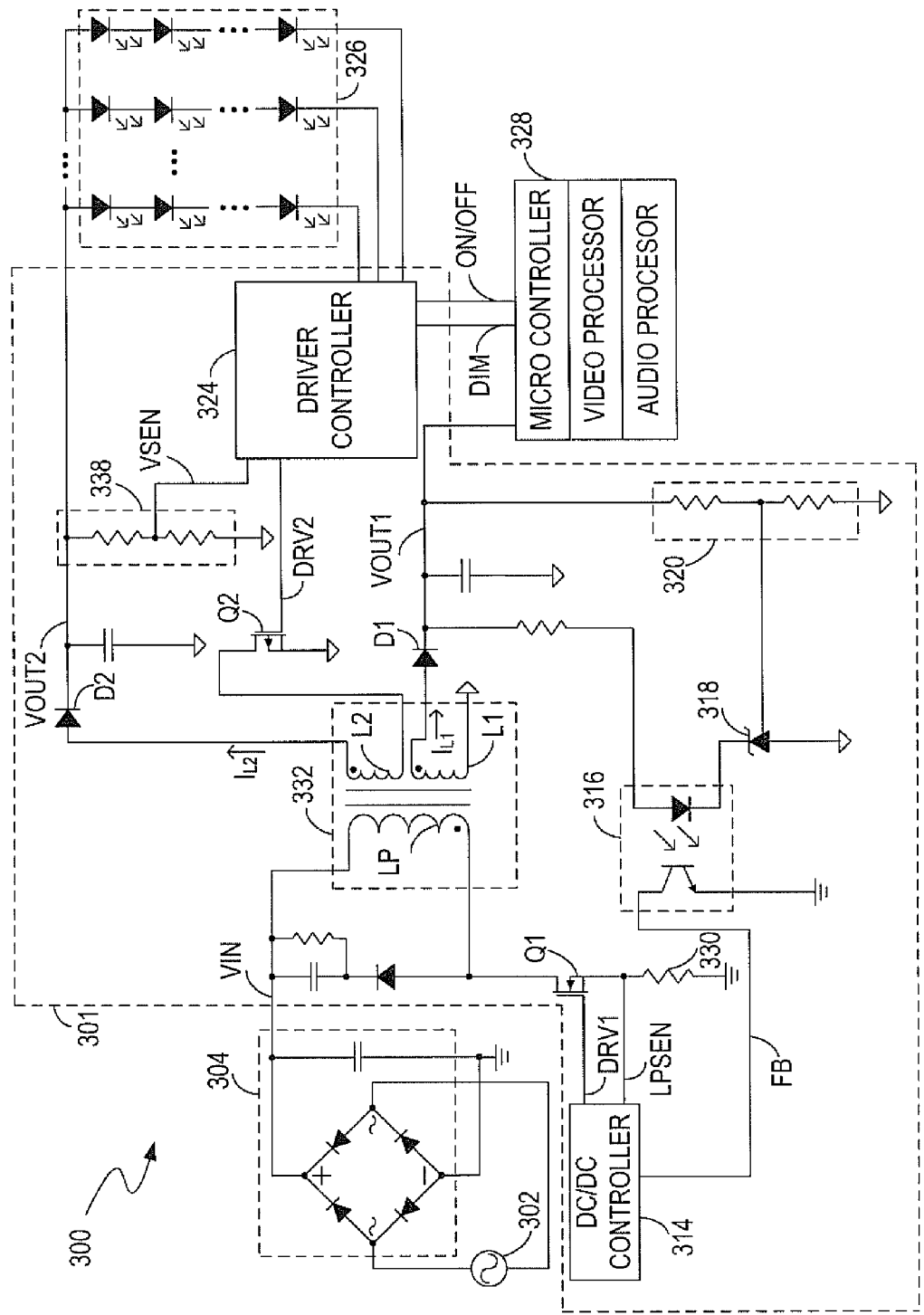
FIG. 3 illustrates a display system, in accordance with one embodiment of the present invention.

FIG. 3 illustrates a display system 300, in accordance with one embodiment of the present invention. The display system 300 includes an AC/DC converter (e.g., a bridge rectifier 304) for converting an AC voltage from an AC power source 302 to a DC voltage VIN, and a DC/DC converter 301 for converting the DC voltage VIN to a first output voltage VOUT1 and a second output voltage VOUT2. The DC/DC converter 301 includes a transformer 332 coupled to the bridge rectifier 304. The transformer 332 includes a primary winding LP, a secondary winding L1 and a secondary winding L2. The DC/DC converter 301 further includes a switch Q1 coupled in series with the primary winding LP of the transformer 332, a switch Q2 coupled in series with the secondary winding L2, a DC/DC controller 314 coupled to the switch Q1 for controlling input power to the primary winding LP to regulate the output voltage VOUT1, and a driver controller 324 for controlling the switch Q2 to regulate the output voltage VOUT2. In the example of FIG. 3, the switch Q1 is an n-type metal-oxide-semiconductor field-effect transistor (NMOSFET) and the switch Q2 is a p-type metal-oxide-semiconductor field-effect transistor (PMOSFET).

In operation, the transformer 332 receives the DC voltage VIN at the primary winding LP, and provides two output voltages VOUT1 and VOUT2 at the secondary windings L1 and L2 respectively. The output voltage VOUT1 is supplied to a control module 328 which includes a micro controller, a video processor and an audio processor, in one embodiment. The micro-controller can control the video processor and the audio processor, e.g., according to an input from a user, to adjust the video and audio outputs. The output voltage VOUT2 can be supplied to an illuminating module 326 which includes one or more light sources, e.g., multiple LED strings. The control module 328 generates an ON/OFF signal to turn on or turn off the illuminating module 326, and generates a DIM signal to adjust brightness of the illuminating module 326. An error amplifier 318 senses VOUT1 via a voltage sensor, e.g., a voltage divider 320, coupled to the secondary winding L1, and controls an optocoupler 316 to generate a feedback signal FB indicative of VOUT1. The DC/DC controller 314 receives the feedback signal FB from the optocoupler 316 and a sensing signal LPSEN from a current sensor 330 coupled in series with the switch Q1, and generates a control signal DRV1 to control the switch Q1 so as to regulate VOUT1 to a first voltage. In one embodiment, the control signal DRV1 is a pulse modulation signal, e.g., a pulse-width modulation (PWM) signal. The sensing signal LPSEN indicates a current flowing through the primary winding LP.

The driver controller 324 provides sensing signals ISEN_1, ISEN_2, . . . ISEN_N indicating currents through the LED strings in the illuminating module 326 respectively, and receives a sensing signal VSEN indicating the voltage VOUT2 of the secondary winding L2. In one embodiment, the sensing signal VSEN is obtained from a voltage sensor, e.g., a voltage divider 338 coupled to the secondary winding L2. The driver controller 324 generates a control signal DRV2 according to the sensing signals ISEN_1, ISEN_2, . . . ISEN_N and VSEN to control the switch Q2 so as to regulate VOUT2 to a second voltage. In one embodiment, the control signal DRV2 is a pulse modulation signal, e.g., a PWM signal. The driver controller 324 also controls the ON/OFF status and dimming of the illuminating module 326 based on the ON/OFF signal and the DIM signal generated by the control module 328.

Figure 4:
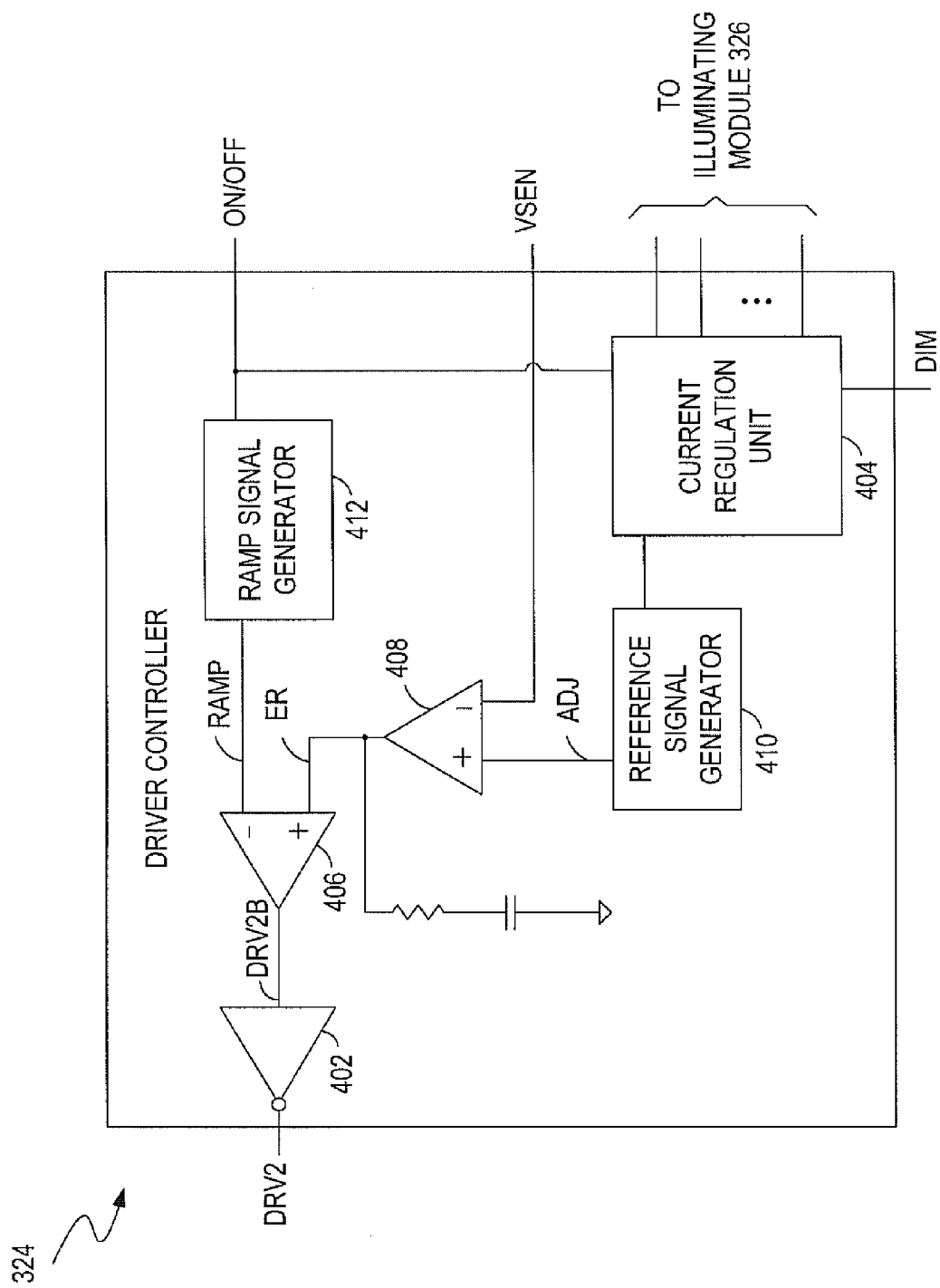
FIG. 4 illustrates an example of a driver controller in FIG. 3, in accordance with one embodiment of the present invention.

FIG. 4 illustrates an example of the driver controller 324 in FIG. 3, in accordance with one embodiment of the present invention. In the example of FIG. 4, the driver controller 324 includes a current regulation unit 404, a reference signal generator 410, an error amplifier 408, a ramp signal generator 412, a comparator 406, and an inverter buffer 402. FIG. 4 is described in combination with FIG. 3.

In one embodiment, the current regulation unit 404 is operable for balancing the currents through the LED strings in the illuminating module 326 such that the current through each LED string is substantially the same according to a target current level. As used herein, the term "substantially the same" means that the current through the LED strings may vary but within a range so that the LED strings can generate desirable light outputs with a relatively uniform brightness.

Furthermore, the current regulation unit 404 adjusts the output voltage VOUT2 to satisfy a power requirement of the illuminating module 326. More specifically, the current regulation unit 404 adjusts the output voltage VOUT2 such that a voltage drop across each LED string is sufficient to enable each LED string to generate a current that is substantially the same as the target current level, in one embodiment. The current regulation unit 404 provides the sensing signals ISEN_1, ISEN_2, . . . ISEN_N and controls the reference signal generator 410 accordingly to generate a reference signal ADJ based on a power requirement of the illuminating module 326. In one embodiment, the current regulation unit 404 can control the reference signal generator 410 to increase the reference signal ADJ so as to increase the output voltage VOUT2, and vice versa.

The error amplifier 408 receives the reference signal ADJ and the sensing signal VSEN indicative of VOUT2, and generates an error signal ER by comparing the reference signal ADJ to the sensing signal VSEN. If the reference signal ADJ increases, the error amplifier 408 increases the error signal ER, in one embodiment. The comparator 406 compares the error signal ER with the ramp signal RAMP generated by the ramp signal generator 412 to generate a signal DRV2B. In one embodiment, the inverter buffer 402 inverts the signal DRV2B and outputs a control signal DRV2 through the inverter buffer 402 to control the switch Q2, e.g., a PMOSFET, coupled in series with the secondary winding L2. In the example of FIG. 4, the signal DRV2B and the control signal DRV2 are pulse modulation signals, e.g., PWM signals. If the control signal DRV2 is in a first state (e.g., digital 0), the switch Q2 is on. If the control signal DRV2 is in a second state (e.g., digital 1), the switch Q2 is off. A duty cycle of DRV2 is determined by the error signal ER. If the error signal ER increases, the comparator 406 increases a duty cycle of the control signal DRV2B, in one embodiment. Consequently, the conduction duty cycle of the switch Q2 is increased. Therefore, an average current flowing through the secondary winding L2 is increased and thus the output voltage VOUT2 is increased.

Figure 5:
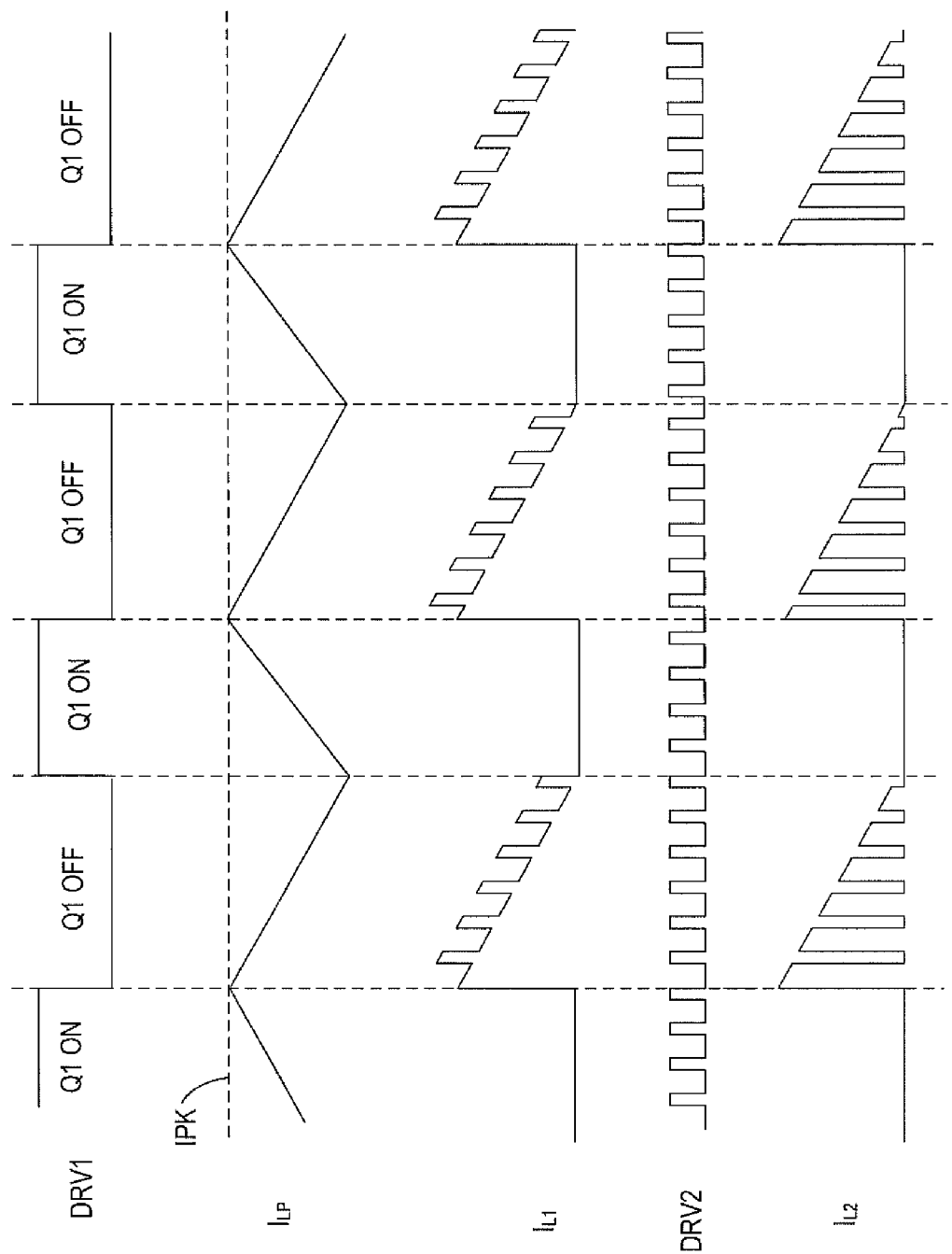
FIG. 5 illustrates an example of waveforms associated with the display system in FIG. 3, in accordance with one embodiment of the present invention.

FIG. 5 illustrates an example of waveforms associated with the display system 300 in FIG. 3, in accordance with one embodiment of the present invention. FIG. 5 is described in combination with FIG. 3. More specifically, FIG. 5 shows the control signal DRV1 generated by the DC/DC controller 314, the status of the switch Q1, the current $I_{LP}$ flowing through the primary winding LP, the current $I_{L1}$ flowing through the secondary winding L1, the control signal DRV2 generated by the driver controller 324, and the current $I_{L2}$ flowing through the secondary winding L2.

In operation, the DC/DC controller 314 receives the sensing signal LPSEN indicating the current $I_{LP}$ flowing through the primary winding LP, and generates the control signal DRV1 to control the switch Q1. If the DRV1 is in a first state, e.g., digital 1, the switch Q1 is on, the current $I_{LP}$ flowing through the primary winding LP increases. When the switch Q1 is on, there is no current flowing through the secondary windings L1 and L2 because a diode D1 coupled to the secondary winding L1 and a diode D2 coupled to the secondary winding L2 are both reverse-biased. When the voltage of the sensing signal LPSEN increases to a predetermined voltage, which indicates that the current $I_{LP}$ reaches a predetermined current level IPK, the DC/DC controller 314 generates the control signal DRV1 in a second state, e.g., digital 0, to turn off the switch Q1. When the switch Q1 is off, the current $I_{LP}$ of the primary winding LP decreases. Accordingly, a current $I_{L1}$ of the secondary winding L1 and a current $I_{L2}$ of the secondary winding $I_{L2}$ decreases and are both regulated by the switch Q2. The conductance state of the switch Q2 is controlled by the control signal DRV2. Assume that the number of turns of the primary winding LP is NP, the number of turns of the secondary winding L1 is N1, and the number of turns of the secondary winding L2 is N2. If the control signal DRV2 is in the first state, the switch Q2 is on, and thus the current $I_{L1}$ flows from the secondary winding L1 through the diode D1 to the control module 328, and the current $I_{L2}$ flows from ground through the switch Q2, the secondary winding L2, the diode D2 to the illuminating module 326. When the switch Q2 is on, and $I_{L1}$ and $I_{L2}$ can be given by:

$$NP*I_{LP}=N1*I_{L1}+N2*I_{L2}. \quad (1)$$

If the control signal DRV2 is in the second state, the switch Q2 is off and $I_{L2}$ remains cut-off. When the switch Q2 is off, $I_{L1}$ can be given by:

$$NP*I_{LP}=N1*I_{L1}. \quad (2)$$

In one embodiment, the transformer 332 operates in a constant frequency mode in which the control signal DRV1 has a fixed frequency and an adjustable duty cycle. In another embodiment, both the frequency and the duty cycle of the control signal DRV1 are adjustable.

As described in relation to FIG. 3 and FIG. 5, the DC/DC controller 314 regulates the output voltage VOUT1 generated at the secondary winding L1 by controlling the input power to the primary winding LP. More specifically, the DC/DC controller 314 controls the switch Q1 coupled in series with the primary winding LP based on the feedback signal FB and the sensing signal LPSEN. The feedback signal FB indicates the output voltage VOUT1. The sensing signal LPSEN indicates the current $I_{LP}$ of the primary winding LP. The driver controller 324 regulates the output voltage VOUT2 generated at the secondary winding L2 by controlling the switch Q2 coupled in series with the secondary winding L2 based on the sensing signals ISEN_1, ISEN_2, ... ISEN_N and the sensing signal VSEN. The sensing signals ISEN_1, ISEN_2, ... ISEN_N indicate the currents through the LED strings in the illuminating module 326 respectively. The sensing signal VSEN indicates the output voltage VOUT2. As a result, the boost converter 122 in the conventional display system 100 or the DC/DC controller 216, the transformer 232 and the optocoupler 234 in the conventional display system 200 can be eliminated, and thus cost is reduced.

Figure 6:
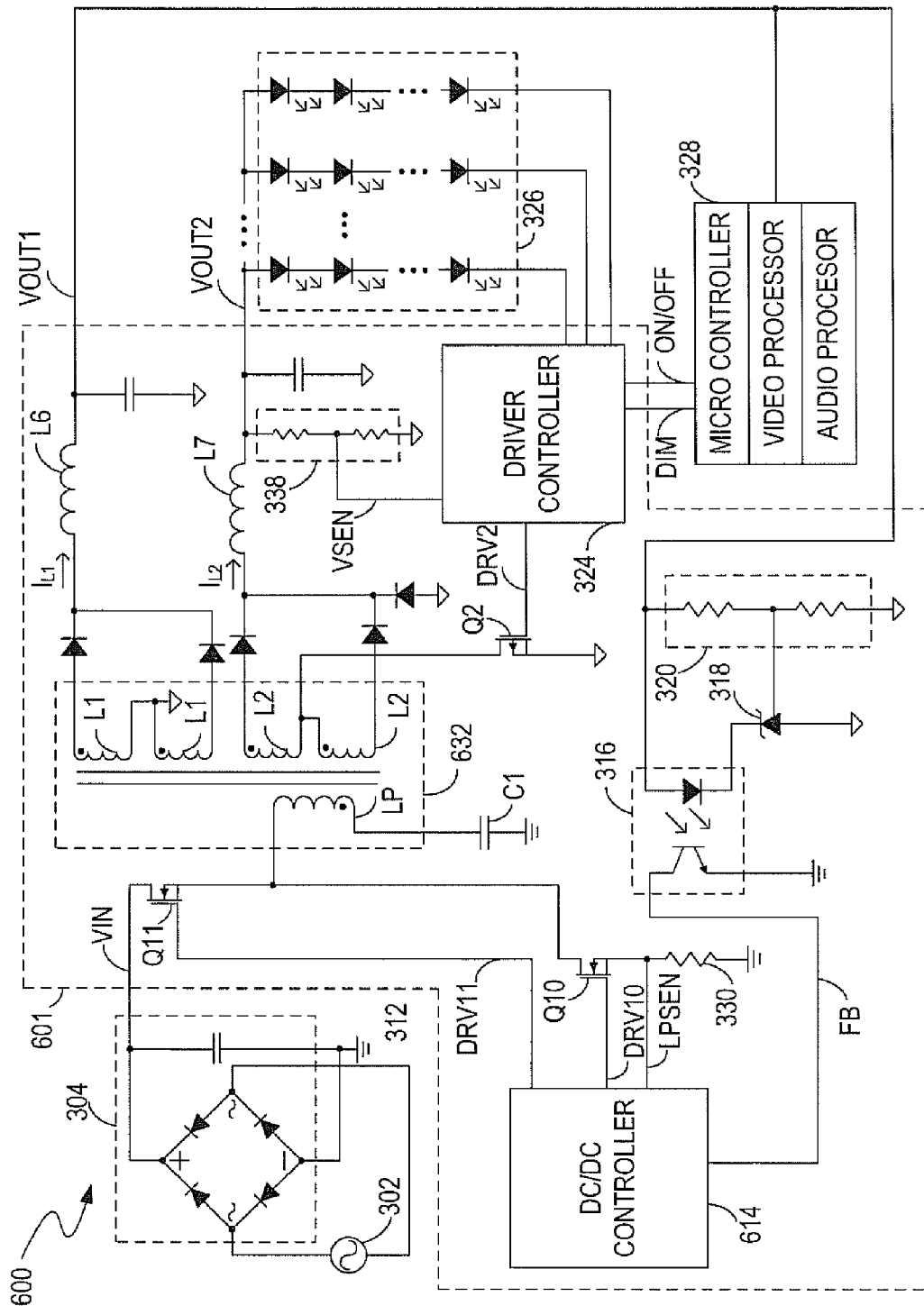
FIG. 6 illustrates a display system, in accordance with another embodiment of the present invention.
Figure 7:
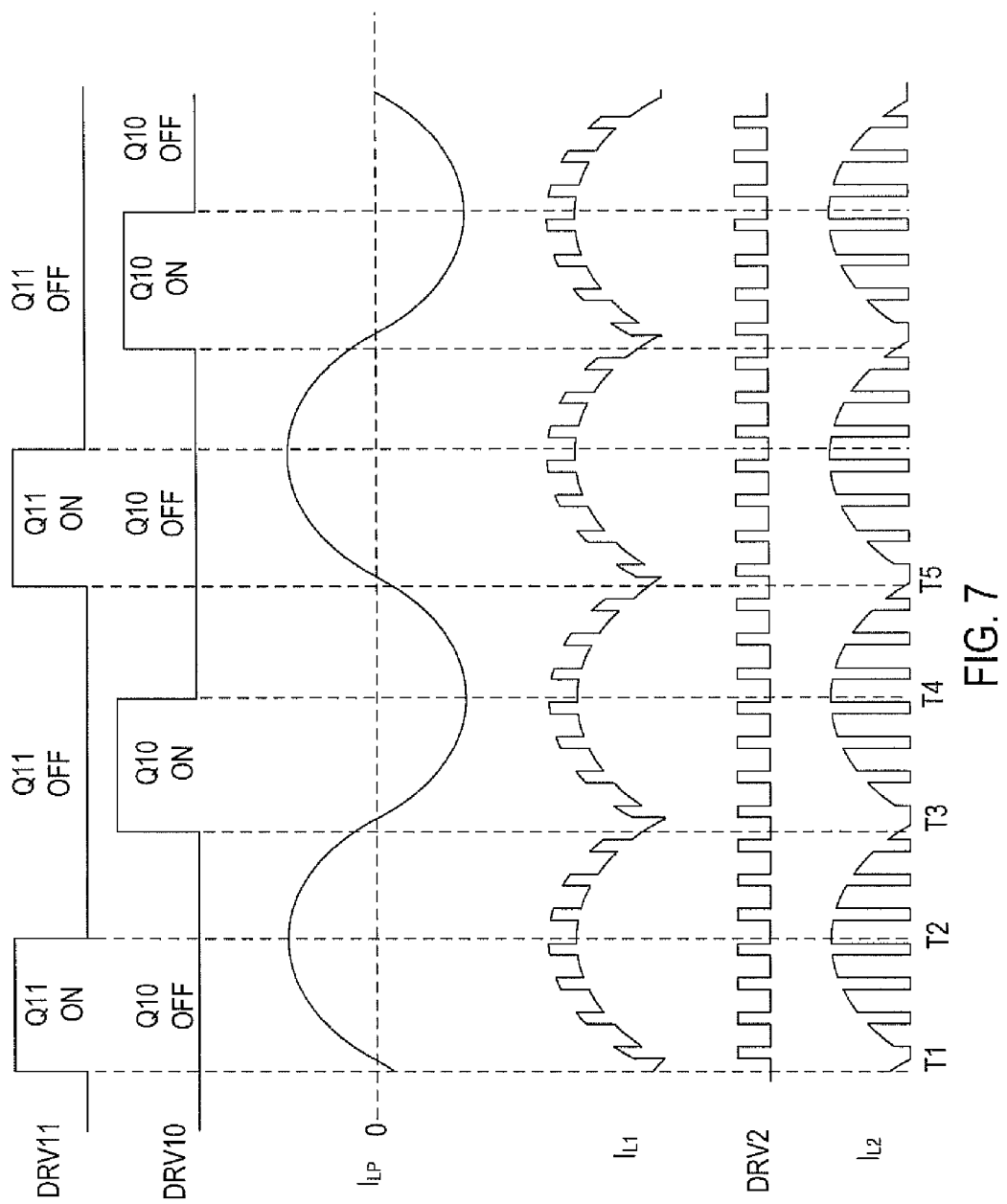
FIG. 7 illustrates an example of waveforms associated with the display system in FIG. 6, in accordance with one embodiment of the present invention.

FIG. 6 illustrates a display system 600, in accordance with another embodiment of the present invention. Elements labeled the same as in FIG. 3 have similar functions. FIG. 7 illustrates an example of waveforms associated with the display system 600 in FIG. 6, in accordance with one embodiment of the present invention. FIG. 6 is described in combination with FIG. 7.

The display system 600 includes an AC/DC converter (e.g., a bridge rectifier 304) for converting an AC voltage from an AC power source 302 to a DC voltage VIN, and a DC/DC converter 601 for converting the DC voltage VIN to a first output voltage VOUT1 and a second output voltage VOUT2. The DC/DC converter 601 includes a transformer 632 coupled to the bridge rectifier 304. In the example of FIG. 6, the transformer 632 includes a primary winding LP, a secondary winding L1 and a secondary winding L2. In one embodiment, the secondary winding L1 is tapped and has a tap point coupled to ground. The secondary winding L2 is also tapped and has a tap point coupled to ground through a switch Q2. The DC/DC converter 601 further includes a switch Q11 coupled between the bridge rectifier 304 and the primary winding LP, a switch Q10 coupled between the primary winding LP and ground, a DC/DC controller 614 coupled to the switches Q10 and Q11 for controlling input power to the primary winding LP to regulate the output voltage VOUT1, and a driver controller 324 coupled to the switch Q2 and for controlling the switch Q2 to regulate the output voltage VOUT2.

In the example of FIG. 6, the switch Q10 and the switch Q11 are NMOSFETs and controlled by control signals DRV10 and DRV11 respectively. The control signals DRV10 and DRV11 are generated by the DC/DC controller 614 based on a feedback signal FB which indicates the output voltage VOUT1 and based on a sensing signal LPSEN indicates the current $I_{LP}$ flowing through the primary winding LP. The sensing signal LPSEN is provided by a current sensor 330 coupled in series with the primary winding LP. For example, the sensing signal LPSEN can be utilized by the DC/DC controller 614 to detect an over-current condition.

In the example of FIG. 6, the switch Q2 is a PMOSFET and controlled by a control signal DRV2. The control signal DRV2 is generated by a driver controller 324 based on a sensing signal VSEN and sensing signals ISEN_1, ISEN_2, ... ISEN_N. In one embodiment, the control signal DRV2 is a pulse modulation signal, e.g., a PWM signal. If the control signal DRV2 is in a first state, the switch Q2 is on. If the control signal DRV2 is in a second state, the switch Q2 is off. The sensing signal VSEN indicates the output voltage VOUT2. The sensing signals ISEN_1, ISEN_2, ... ISEN_N indicate the currents through the LED strings in the illuminating module 326 respectively.

In operation, the DC/DC controller 614 generates the control signals DRV10 and DRV11 to alternately turn on the switches Q10 and Q11 to control the input power to the primary winding LP of the transformer 632. In one embodiment, both the control signals DRV10 and DRV11 are pulse signals with a predetermined duty cycle and an adjustable frequency. The frequency of DRV10 and DRV11 are determined by the DC/DC controller 614 based on a power requirement of the control module 328. The switch Q10 is on when the control signal DRV10 is in a first state (e.g., digital 1) and is off when the control signal DRV10 is in a second state (e.g., digital 0). The switch Q11 is on when the control signal DRV11 is in a first state (e.g., digital 1) and is off when the control signal DRV11 is in a second state (e.g., digital 0).

Initially, the DC/DC controller 614 turns on the switch Q11 at time T1 and maintains the switch Q10 off, in one embodiment. From time T1 to time T2, the switch Q11 is on and the switch Q10 is off, and the current $I_{LP}$ flows from the bridge rectifier 304 through the switch Q11 and the primary winding LP and charges an energy storage element, e.g., a capacitor C1, coupled to the primary winding LP. At time T2, the DC/DC controller 614 turns off the switch Q11 and maintains the switch Q10 off. From time T2 to time T3, both switches Q10 and Q11 are off, and the current $I_{LP}$ flows from ground through the body diode of the switch Q10 and the primary winding LP. Then, the DC/DC controller 614 turns on the switch Q10 at time T3 and maintains the switch Q11 off. From time T3 to time T4, the switch Q10 is on and the switch Q11 is off, and the current $I_{LP}$ flows from ground through the switch Q10 and the primary winding LP until the current $I_{LP}$ decreases to a reference, e.g., zero. After the current $I_{LP}$ decreases to zero, the capacitor C1 discharges, and the current $I_{LP}$ flows from the capacitor C1, through the primary winding LP and the switch Q10 to ground. Then, the DC/DC controller 614 turns off the switch Q10 at time T4. From time T4 to time T5, both switches Q10 and Q11 are off, and the current $I_{LP}$ flows from the capacitor C1 through the primary winding LP, the body diode of the switch Q11 and the bridge rectifier 304 to ground. The DC/DC controller 614 then turns on the switch Q11 again at time T5. Therefore, by controlling the switches Q11 and Q10, the power from the bridge rectifier 304 to the primary winding LP is controlled.

The current $I_{L1}$ is generated by the secondary winding L1. The output voltage VOUT1 is proportional to the average value of the current $I_{L1}$. The DC/DC controller 614 adjusts the frequency of the control signals DRV10 and DRV11 to adjust an average value of the current $I_{L1}$. In one embodiment, if the feedback signal FB generated by the optocoupler 316 indicates that the output voltage VOUT1 is greater than a desired voltage for the control module 328, the DC/DC controller 614 increases the frequency of the control signals DRV10 and DRV11 to decreases the average value of the current $I_{L1}$. As a result, the output voltage VOUT1 is decreased accordingly. Similarly, if the output voltage VOUT1 is less than the desired voltage for the control module 328, the DC/DC controller 614 decreases the frequency of the control signals DRV10 and DRV11 to increases the average value of the current $I_{L1}$. As a result, the output voltage VOUT1 is increased accordingly. As such, the output voltage VOUT1 is regulated to a desired voltage which can satisfy a power requirement of the control module 328.

If the switch Q2 is on, the current $I_{L2}$ is generated by the secondary winding L2 and is proportional to the absolute value of the current $I_{LP}$. When the switch Q2 is on, the current $I_{L2}$ flows from ground through the switch Q2 and portion of the secondary winding L2 to the illuminating module 326. If the switch Q2 is off, the current $I_{L2}$ remains cut-off. Thus, the average value of the current $I_{L2}$ is proportional to a conduction duty cycle of the switch Q2, which is further determined by the control signal DRV2. The output voltage VOUT2 is proportional to the average value of the current $I_{L2}$. The driver controller 324 adjusts the duty cycle of the control signal DRV2 based on the sensing signal VSEN and sensing signals ISEN_1, ISEN_2, ... ISEN_N such that the output voltage VOUT2 is regulated to a voltage which can satisfy a power requirement of the illuminating module 326.

Assume that the number of turns of the primary winding LP is NP, the absolute value of the current $I_{LP}$ is $I'_{LP}$, the tap point of the secondary winding L1 divides the secondary L1 into a first portion with N11 turns and a second portion with N12 turns, the tap point of the secondary winding L2 divides the secondary L2 into a first portion with N21 turns and a second portion with N22 turns. The current $I_{L1}$ flows through the inductor L6 to the control module 328, and the current $I_{L2}$ flows through the inductor L7 to the illuminating module 326. If the control signal DRV2 is in the first state, the switch Q2 is on, the current $I_{LP}$ is in a first half cycle, and $I_{L1}$ and $I_{L2}$ can be given by:

$$NP*I_{LP} = N11*I_{L1} + N21*I_{L2}. \quad (3)$$

If the control signal DRV2 is in the first state, the switch Q2 is on, the current $I_{LP}$ is in a second half cycle, and $I_{L1}$ and $I_{L2}$ can be given by:

$$NP*I'_{LP} = N12*I_{L1} + N22*I_{L2}. \quad (4)$$

If the control signal DRV2 is in the second state, the switch Q2 is off and $I_{L2}$ remains cut-off. When the switch Q2 is off and the current $I_{LP}$ is in a first half cycle, $I_{L1}$ can be given by:

$$NP*I_{LP} = N11*I_{L1}. \quad (5)$$

When the switch Q2 is off and the current $I_{LP}$ is in a second half cycle, $I_{L1}$ can be given by:

$$NP*I'_{LP} = N12*I_{L1}. \quad (6)$$

Figure 8:
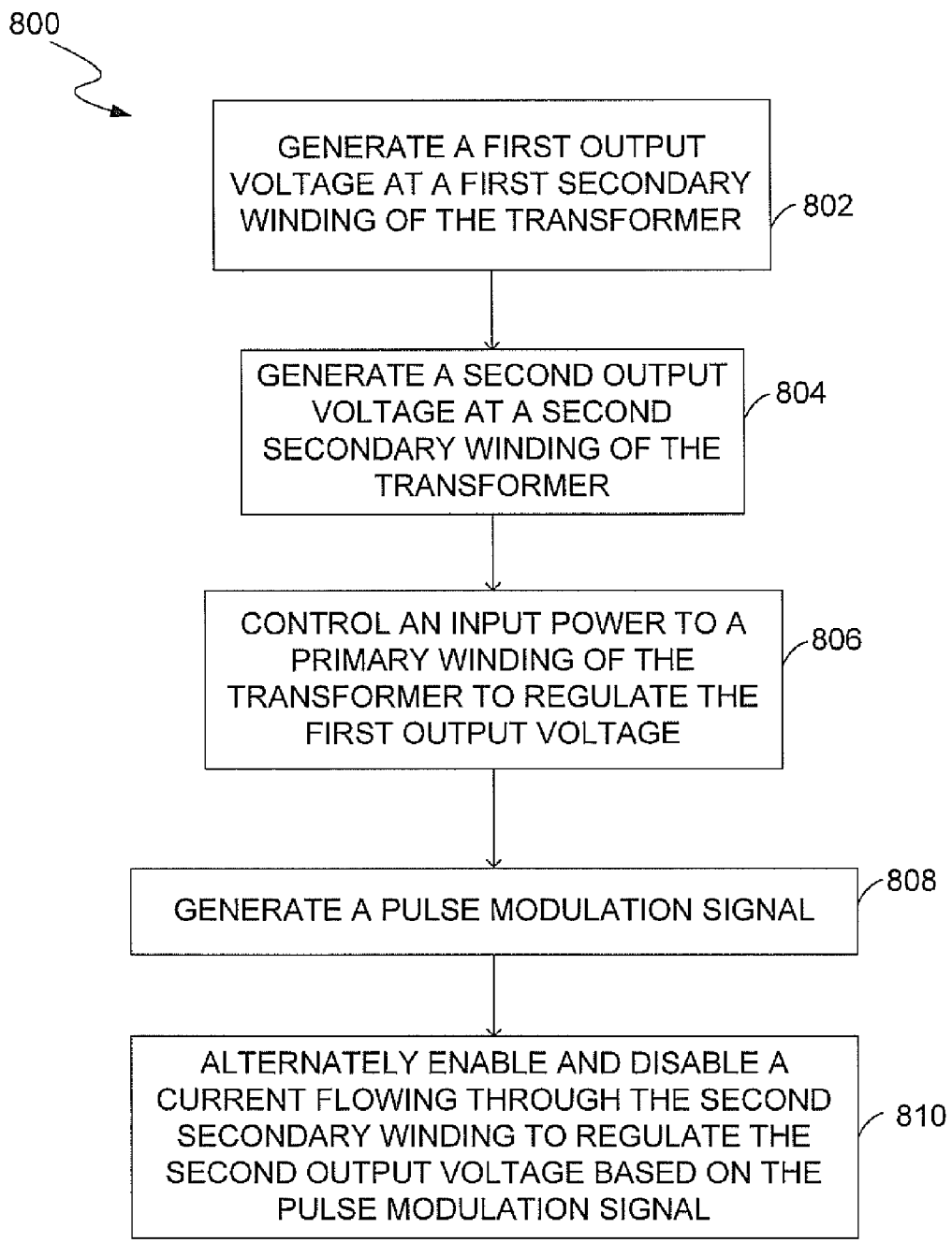
FIG. 8 illustrates a flowchart of a method for controlling a transformer to generate multiple output voltages, in accordance with one embodiment of the present invention.

FIG. 8 illustrates a flowchart of a method for controlling a transformer to generate multiple regulated output voltages, in accordance with one embodiment of the present invention. FIG. 8 is described in combination with FIG. 3 and FIG. 6.

In block 802, a first output voltage is generated at a first secondary winding L1 of a transformer (e.g., the transformer 332 in FIG. 3 or the transformer 632 in FIG. 6). In block 804, a second output voltage is generated at a second secondary winding L2 of the transformer. In block 806, input power received by the transformer at a primary winding LP is controlled to regulate the first output voltage.

In block 808, a pulse modulation signal is generated (e.g., by a driver controller 324 in FIG. 3 or by a driver controller 324 in FIG. 6). In block 810, a current flowing through the second secondary winding L2 is alternately enabled and disabled to regulate the second output voltage based on the pulse modulation signal. For example, a switch (e.g., the switch Q2 in FIG. 3 or the switch Q2 in FIG. 6) coupled to the second secondary winding L2 is controlled by the pulse modulation signal in order to regulate the second output voltage. If the pulse modulation signal is in a first state, the switch is on, a current flows through the second secondary winding L2 to a load. If the pulse modulation signal is in a second state, the switch is off, the current flowing through the second secondary winding L2 remains cut-off.

Accordingly, the present invention provides DC/DC converters with multiple regulated outputs. The DC/DC converters control input power to a primary winding of a transformer to regulate a first output voltage generated by a first secondary winding, and control a switch coupled to a second secondary winding of the transformer to regulate a second output voltage generated by the second secondary winding. The DC/DC converters according to the present invention can be used in a display system. As such, the extra components such as a boost converter or a second transformer used in the prior arts for regulating the second output voltage can be eliminated, and thus cost is reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A DC/DC converter comprising:
 a transformer having a primary winding coupled to a power source, a first secondary winding operable for providing a first output voltage and a second secondary winding operable for providing a second output voltage;
 a first controller coupled to said primary winding and operable for controlling input power to said primary winding to regulate said first output voltage; and
 a first switch coupled to said second secondary winding and operable for regulating said second output voltage,
 wherein said first switch is controlled by a pulse modulation signal, wherein a current flows through said second secondary winding if said pulse modulation signal is in said first state, and wherein said current flowing through said second secondary winding remains cut-off if said pulse modulation signal is in said second state,
 wherein the DC/DC converter further comprises a driver controller coupled to said first switch and operable for generating said pulse modulation signal to control said first switch,
 wherein said first output voltage is supplied to a first load and said second output voltage is supplied to a second load, and wherein said driver controller is operable for generating said pulse modulation signal based on a power requirement of said second load.

2. The DC/DC converter of claim 1, wherein said second secondary winding is tapped and wherein said first switch is coupled between a tap point of said second secondary winding and ground.

3. The DC/DC converter of claim 1, further comprising:
 a second switch coupled between said power source and said primary winding;
 a third switch coupled between said primary winding and ground;
 wherein said first controller is operable for alternately turning on said second switch and said third switch to control said input power to said primary winding.

4. The DC/DC converter of claim 1, wherein said driver controller comprises:
 a reference signal generator operable for generating a reference signal based on said power requirement of said second load; and
 an error amplifier operable for generating an error signal based on said reference signal and a sensing signal indicative of said second output voltage.

5. The DC/DC converter of claim 4, wherein said second load comprises a plurality of light sources, and wherein said driver controller comprises a current regulation unit operable for balancing currents through said light sources.

6. The DC/DC converter of claim 4, wherein said DC/DC converter further comprises a comparator operable for comparing a ramp signal with said error signal to generate said pulse modulation signal.

7. A system, comprising:
 a transformer having a primary winding coupled to a power source, a first secondary winding operable for providing a first output voltage and a second secondary winding operable for providing a second output voltage; and
 a driver controller coupled to said second secondary winding and operable for generating a pulse modulation signal to alternately enable and disable a current flowing through said second secondary winding,
 wherein said current flows through said second secondary winding if said pulse modulation signal is in a first state,
 wherein said current flowing through said second secondary winding remains cut-off if said pulse modulation signal is in a second state, and
 wherein said first output voltage is supplied to a first load and said second output voltage is supplied to a second load, and wherein said driver controller is operable for generating said pulse modulation signal based on a power requirement of said second load.

8. The system of claim 7, further comprising:
 a switch coupled to said second secondary winding,
 wherein said switch is controlled by said pulse modulation signal.

9. The system of claim 7, wherein said second load comprises a plurality of light sources, and wherein said driver controller comprises a current regulation unit operable for balancing currents through said light sources.

10. The system of claim 7, wherein said second secondary winding is tapped and wherein said system comprises a switch coupled between a tap point of said second secondary winding and ground, wherein said switch is controlled by said driver controller.

11. The system of claim 7, further comprising:
 a first switch coupled between said power source and said primary winding;
 a second switch coupled between said primary winding and ground;
 wherein said first switch and said second switch are alternately turned on to control input power to said primary winding.

12. The system of claim 7, wherein said driver controller comprises:
 a reference signal generator operable for generating a reference signal based on a power requirement of said second load; and
 an error amplifier operable for generating an error signal based on said reference signal and a sensing signal indicative of said second output voltage.

13. The system of claim 12, wherein said driver controller further comprises a comparator operable for comparing a ramp signal with said error signal to generate said pulse modulation signal.

14. A method for controlling a transformer, comprising:
 generating a first output voltage at a first secondary winding of said transformer;
 generating a second output voltage at a second secondary winding of said transformer;
 controlling input power to a primary winding of said transformer to regulate said first output voltage;
 generating a pulse modulation signal; and
 alternately enabling and disabling a current flowing through said second secondary winding to regulate said second output voltage based on said pulse modulation signal,
 wherein said current flows through said second secondary winding if said pulse modulation signal is in a first state,
 wherein said current flowing through said second secondary winding remains cut-off if said pulse modulation signal is in a second state,
 wherein said first output voltage is supplied to a first load and said second output voltage is supplied to a second load, and
 wherein the method further comprises:
 generating said pulse modulation signal based on a power requirement of said second load;
 controlling a switch coupled to said second secondary winding based on said pulse modulation signal.

15. The method of claim 14, further comprising:
generating a reference signal based on the power requirement of said second load;
generating a sensing signal indicative of said second output voltage; and
generating an error signal based on said reference signal and said sensing signal.

16. The method of claim 15, further comprising:
generating said pulse modulation signal based on said error signal.

* * * * *